(12) United States Patent
Haines et al.

(10) Patent No.: US 10,989,315 B2
(45) Date of Patent: Apr. 27, 2021

(54) METHOD OF ATTACHING OR REPLACING A PLUG ASSEMBLY

(71) Applicant: Flowserve Management Company, Irving, TX (US)

(72) Inventors: Bradford Haines, Spanish Fork, UT (US); Brian Wayne Howard, Salt Lake City, UT (US); Michael P. Nelson, Lehi, UT (US); Jan Jurewicz, Hallam (AU)

(73) Assignee: Flowserve Management Company, Irving, TX (US)

( * ) Notice: Subject to any disclaimer, the term of this patent is extended or adjusted under 35 U.S.C. 154(b) by 0 days.

(21) Appl. No.: 16/695,140

(22) Filed: Nov. 25, 2019

(65) Prior Publication Data

US 2020/0096119 A1   Mar. 26, 2020

Related U.S. Application Data

(60) Continuation of application No. 13/960,653, filed on Aug. 6, 2013, now abandoned, which is a division of (Continued)

(51) Int. Cl.
  *F16K 5/08* (2006.01)
  *F16K 1/48* (2006.01)

(52) U.S. Cl.
  CPC ............... *F16K 5/08* (2013.01); *F16K 1/482* (2013.01); *Y10T 29/49407* (2015.01); *Y10T 137/0486* (2015.04); *Y10T 137/6065* (2015.04)

(58) Field of Classification Search
  CPC . F16B 9/023; F16K 5/08; F16K 1/482; Y10T 29/49407
  See application file for complete search history.

(56) References Cited

U.S. PATENT DOCUMENTS

| 310,870 A | 1/1885 | Blessing |
| 854,698 A | 5/1907 | Martell |
| (Continued) | | |

FOREIGN PATENT DOCUMENTS

| GB | 2288205 A | 10/1995 |
| JP | S49 48518 U | 4/1974 |
| (Continued) | | |

OTHER PUBLICATIONS

Flowserve Survivor User Manual VLENIM0036, User Instructions, Valtek Mark 10 Survivor Control Panels, Sep. 2006, 20 pages.
(Continued)

*Primary Examiner* — Angelisa L. Hicks
(74) *Attorney, Agent, or Firm* — Phillips Winchester (57) ABSTRACT

A plug assembly includes a plug stem having a plug stem base, a plug head, and a fastening mechanism for fastening the plug stem base to the plug head, the fastening mechanism comprising at least two retainer clamps that surround and provide an interference fit between the plug stem base and the plug head. A method of replacing or attaching a plug head to a plug stem includes providing a plug stem having a plug stem base, providing a plug head, providing a fastening mechanism comprising at least two retainer clamps, and coupling the fastening mechanism around the plug stem base and the plug head to provide an interference fit between the plug stem base and the plug head.

20 Claims, 4 Drawing Sheets

Related U.S. Application Data application No. 12/480,527, filed on Jun. 8, 2009, now Pat. No. 8,500,093.

(60) Provisional application No. 61/059,682, filed on Jun. 6, 2008.

(56) References Cited

U.S. PATENT DOCUMENTS

| | | | |
|---|---|---|---|
| 1,093,868 A | 4/1914 | Leighty | |
| 1,111,391 A * | 9/1914 | Kneass | F16K 1/482 |
| | | | 251/86 |
| 1,431,662 A | 10/1922 | Horning | |
| 1,763,486 A | 6/1930 | Leslie | |
| 1,854,370 A * | 4/1932 | Droege | F16K 1/482 |
| | | | 251/86 |
| 1,963,685 A | 6/1934 | Shimer | |
| 2,051,124 A * | 8/1936 | Aull | F16K 1/482 |
| | | | 403/341 |
| 2,678,187 A | 5/1954 | Peters | |
| 2,725,221 A | 11/1955 | Pontow | |
| 3,265,351 A | 8/1966 | Bredtschneider | |
| 3,290,003 A | 12/1966 | Kessler | |
| 3,326,512 A | 6/1967 | Clarke | |
| 3,488,824 A * | 1/1970 | Boteler | F16K 7/126 |
| | | | 29/890.124 |
| 3,558,098 A | 1/1971 | Puster | |
| 3,581,818 A | 6/1971 | Kinley | |
| 3,680,188 A | 8/1972 | Mason | |
| 3,737,144 A * | 6/1973 | Duncan | F16K 1/22 |
| | | | 251/307 |
| 4,044,834 A | 8/1977 | Perkins | |
| 4,142,543 A | 3/1979 | Krause | |
| 4,249,786 A * | 2/1981 | Mahoff | F16L 27/127 |
| | | | 439/192 |
| 4,325,647 A | 4/1982 | Maier et al. | |
| 4,342,406 A | 8/1982 | Lee | |
| 4,442,996 A | 4/1984 | Erwin | |
| 4,496,176 A | 1/1985 | Weinhold | |
| 4,497,467 A | 2/1985 | DeWald et al. | |
| 4,585,210 A | 4/1986 | Adams | |
| 4,598,895 A | 7/1986 | DeWald et al. | |
| 4,771,803 A | 9/1988 | Berchem et al. | |
| 4,791,953 A | 12/1988 | Berchem | |
| 4,815,704 A | 3/1989 | Berchem | |
| 4,911,403 A | 3/1990 | Lockwood | |
| 4,923,173 A | 5/1990 | Szymaszek et al. | |
| 5,007,614 A | 4/1991 | Lockwood | |
| 5,011,196 A * | 4/1991 | Sabatier | F16L 23/04 |
| | | | 277/614 |
| 5,050,630 A * | 9/1991 | Farwell | F16K 17/162 |
| | | | 137/68.25 |
| 5,353,832 A | 10/1994 | Berchem | |
| 5,386,967 A | 2/1995 | Enniss et al. | |
| 5,503,122 A | 4/1996 | Ritland et al. | |
| 5,605,172 A | 2/1997 | Schubert et al. | |
| 5,618,026 A | 4/1997 | Geyer | |
| 5,713,482 A * | 2/1998 | Bordner | B65D 45/345 |
| | | | 220/320 |
| 6,109,590 A | 8/2000 | Koerner | |
| 6,685,167 B2 | 2/2004 | Robison et al. | |
| 6,793,182 B2 | 9/2004 | Hopkins et al. | |
| 6,793,198 B2 | 9/2004 | Robison et al. | |
| 8,146,883 B2 * | 4/2012 | O'Hara | F16K 1/48 |
| | | | 251/77 |
| 2001/0013587 A1 | 8/2001 | Robison et al. | |
| 2008/0011975 A1 | 1/2008 | Robison et al. | |

FOREIGN PATENT DOCUMENTS

| | | |
|---|---|---|
| JP | 55002829 A | 1/1980 |
| JP | 57194957 A | 11/1982 |
| JP | 60189672 A | 9/1985 |
| JP | 62107171 A | 7/1987 |
| JP | H676776 | 10/1994 |
| JP | 2000257726 A | 9/2000 |
| JP | 2005299873 A | 10/2005 |

OTHER PUBLICATIONS

International Preliminary Report on Patentability for International Application No. PCT/US2009/046623 dated Dec. 6, 2010, 5 pages.
International Search Report for International Application No. PCT/US2009/046623 dated Jan. 20, 2010, 3 pages.
International Written Opinion for International Application No. PCT/US2009/046623 dated Jan. 20, 2010, 4 pages.
Orlov, P.I., "Principles of Design", 3rd edition, Moscow, "Machine Building", 1988, p. 210 Fig. 494, VI.
First Examination Report for Indian Application No. 4664/KOLNP/2010 dated Dec. 13, 2016, 9 pages.
Supplementary European Search Report for European Application No. 09759612.6 dated Jan. 20, 2016, 6 pages.

* cited by examiner

METHOD OF ATTACHING OR REPLACING A PLUG ASSEMBLY

CROSS-REFERENCE TO RELATED APPLICATION

This application is a continuation of U.S. patent application Ser. No. 13/960,653, filed Aug. 6, 2013, pending, which is a divisional of U.S. Pat. No. 8,500,093, filed Jun. 8, 2009, which is a utility conversion of U.S. Provisional Patent Application Ser. No. 61/059,682, filed Jun. 6, 2008, for "PLUG ASSEMBLY WITH PLUG HEAD ATTACHMENT."

FIELD OF THE INVENTION

This invention relates to industrial valves. More specifically, this invention relates to methods for attaching valve plug heads to valve plug stems.

BACKGROUND OF THE INVENTION

Valves and valve plugs are well known in the art. Typically, valve plug heads are positioned within the valve to control the volume of flow passing through the valve. By modifying the position of the plug head relative to the valve seat, control of the flow volume is achieved, thus allowing diversion and restriction of fluid flow. Plug heads are subjected to fluid forces, chemical attack, thermal stresses, impact from particulates and debris, as well as the forces used to attach it to the plug stem and seat loading forces that can occur when the plug head comes into contact with the valve seat. The valve head is typically attached to a plug stem, which in turn is connected to an actuating device. This actuating device is controlled to move the plug stem, which acts to change the position of the plug head to control the flow passing through the valve.

The plug stem is subjected to axial forces as the actuator moves it, mounting forces relating to the actuator attachment, and the long cylindrical section is subjected to bending forces. The plug head and the plug stem perform distinctly different purposes and are subjected to very different forces. The plug head, sitting in the middle of the flow stream, diverts and/or restricts flow, and is subjected to fluid and seat loading forces and to forces related to attaching the plug head to the plug stem. In contrast, the plug stem is moved by an actuating device to provide a sealing surface and is subject to axial and bending forces. In industrial, high volume/flow rate valves, the forces placed on plug stems and plug heads are typically significant contributors to valve failure.

Traditionally, valve plug heads are either composed of one monolithic material or make use of more than one material. Plug heads employing more than one type of material have particular advantages, in particular, better erosion and corrosion resistance, improved shock absorption, working life, and thermal expansion qualities. However, the use of a plurality of material types has been limited by the ability to effectively join the materials together economically and without creating stress points that limit the life of the plug head.

The most common methods of fixing dissimilar materials together in a valve plug are taper fitting or interference fitting, both of which employ a retaining ring that is fixed around the plug head. Taper fittings have been shown typically to subject the plug head to undesirable stresses, contribute to thermal expansion problems, and are difficult to repair. The typical taper fitting design requires a mating of two conical surfaces, one on the plug head, and the other on the retaining ring. Since neither the plug head nor the retaining ring can be manufactured with ideal cone shapes, the plug and seat may not mate perfectly. As such, loading between the two mated structures may not be uniform. Additionally, the force of the retaining ring on the plug head is exerted close to the edge of the plug head and is generally perpendicular to the angle of the conical surface. The location and angle of the force can introduce undesirable tensile forces into the portion of the plug head that bears the force. Often the desired plug head material may demonstrate weak tensile strength, thus introducing additional tensile forces that can either limit the selection of plug head materials or that can cause breaking of the edge of the plug head, separating the plug head from the plug stem and causing valve failure. Also, as the retaining ring wears away through normal corrosion and erosion, the shape of the contact area can change, typically moving closer to the edge of the plug head. This contact area change tends to concentrate forces on the edge of the plug head and increases the likelihood that the edge of the plug head will fracture, thereby causing the plug head to separate from the plug stem. The stresses induced with the taper fit are difficult to quantify and, therefore, can detract from a valve plug's performance. Variables in the welding process, such as weld shrinkage, inter-pass temperature, amperage of weld, inert gas environment, and the amount of initial burn-in, can change the amount of stress in the plug head.

As noted above, typical prior taper fit designs attach the taper fit ring to the plug stem via welding. This approach results in the retaining ring and the plug stem becoming permanently joined into one component. If the plug head wears away or breaks and the plug stem is still usable, the typical taper fit design does not lend itself to achieving the proper concentricity between the plug head and the plug stem after the plug head has been replaced. When a taper fit valve plug is repaired, the plug stem has already been machined, so it is not possible to make adjustments in the plug stem to ensure concentricity with the plug head. If the plug head is misaligned, adjustments cannot be made without cutting the taper fit ring off. For at least these reasons, taper fit valve plugs are usually discarded (as opposed to being repaired) when the plug head has broken or worn away. During assembly, the taper fit ring is typically fit tightly around the ceramic plug and the taper fit ring is welded to the plug stem. At elevated operating temperatures, the taper fit ring increases in size more than the plug head, and the plug head becomes somewhat loose in the taper fit ring, which thereby leads to early failure of the fit in operating conditions.

Interference fittings typically require a bulkier retaining ring, contributing to the load on the plug head. Interference fittings also require more complex procedures to replace plug heads and are generally limited in their service temperature ranges. An interference fit achieves more uniform loading of the plug head than does the taper fit. However, the typical interference fit uses a one-piece retaining ring that not only holds the plug head but also attaches the plug head/retaining ring assembly to the plug stem. The interference fit also must have sufficient material to allow for the wear due to erosion and corrosion without causing the plug head to separate from the plug stem. These requirements result in a bulkier retaining ring than is required to hold the plug head in place, which contributes to an additional load on the plug head. This additional load introduces tensile stresses, which tend to contribute to plug head breaking and separation, which can result in valve failure.

Even with interference fit designs, the task of replacing the plug head is quite complex. To replace the plug head, the interference fit ring must be cut, separating the plug head and ring assembly from the plug stem. This process is usually performed on a lathe or mill. If the ring is to be used again, it is necessary to separate the ring from the plug head. Certain combinations of plug head and interference fit ring materials can be separated by heating the assembly in an industrial oven. If the coefficient of thermal expansion of the retaining ring is sufficiently higher than the plug head, the retaining ring will expand more quickly and the interference fit will be negated as a space forms between the two surfaces. This approach is somewhat destructive and requires that the interference-fit ring be carefully checked before reuse. Also, this heating method only works with certain combinations of materials. Moreover, even when it may work, the plug head replacement process requires specialized manufacturing facilities that are generally unavailable to users in remote locations. Therefore, replacing plug heads for valve plugs is not a typical industry practice for certain combinations of materials or user locations.

Another problem with interference fittings is that service temperature ranges are limited because of differential thermal expansion between the plug head and ring materials. The amount of interference between the plug head and the ring is directly related to the amount of stress in a plug head. The amount of interference at ambient temperature becomes a concern when it places large amounts of stress on the plug head. Thus, when the valve plug is installed and is warming to operating temperature, the plug head is more highly stressed and is more vulnerable to failure. It has also been observed that because of these stresses, certain valve plugs, head and rings, could not be used because the ambient temperatures, or below ambient storage temperatures, could cause the plug head to fail before they could placed into service.

Also, both taper fittings and interference fittings suffer from the impracticalities of stress relieving heat affected weld zones with heat treatments. For highly corrosive fluid applications and with certain materials, it is important to stress relieve heat affected weld zones with heat treatments. With both prior existing taper fit and interference fit designs, this has not been considered practical because stress-relieving typically is performed at temperatures high enough to allow the plug head to be excessively loose in the ring, and it is not possible to assure that the plug head would return to its proper position upon cooling. Therefore, even though heat treatments might be beneficial, they have generally been avoided.

In view of the foregoing shortcomings, it would be desirable to provide a valve plug design that uses a clamping system to attach the valve plug head to its valve plug stem, and to thereby provide a means of assembling and replacing worn plug heads in the field, while allowing use of different materials for the plug head and the plug stem, where the different materials are selected specifically to address the different function of the plug head and the plug stem. This type of plug design is particularly desirable for use in flow streams that are erosive or corrosive in nature, because plug heads in these kinds of streams typically suffer material loss due to the erosion and/or corrosion and require regular replacement. Often the plug head wears out before other valve components. Therefore, minimizing the occurrences when the plug head fails and must be replaced is very desirable in improving the life cycle and efficiency of the valve.

SUMMARY OF THE INVENTION

One embodiment of the present invention includes attaching a ceramic (or other sacrificial material) plug head to a plug stem. The embodiment uses two retainer half rings (clamps) and two or more bolts/nuts to hold the head onto the plug stem. In this fashion, replacement of the plug head can be easily and quickly accomplished in the field. The two clamps are configured such that a gap is left therebetween on both sides. The bolts/nuts are sacrificial bolts which are inexpensive. Rather than undo the bolting, these bolts can easily be cut off and thrown away. The bolting can then be replaced and a new plug head installed, reusing all of the major components. Other embodiments may use three or more retainer rings (clamps) to hold the plug head onto the plug stem. It is understood that all modifications and embodiments discussed herein may also be adapted to include three or more retainer rings (clamps).

When ceramic plugs are used, it is common to replace field worn plug heads with new ones. These applications often involve scaling, erosion and high temperatures. This design has several advantages over current designs. This design is easier to work on in the field and the factory. Assembly of this design is simpler than previous designs. Some old designs even required shrink fitting and welding of the parts to hold them together. This precluded field assembly of plugs. This design allows simple field assembly. Assembly in the factory is also simplified. The gap left between the two clamps is important as many of the services which require erosion-resistant plug heads have solids in the fluid stream. Solids tend to build up on parts. When threaded parts are used it can make undoing threads impractical or impossible, which would make reusing the stem impossible.

DETAILED DESCRIPTION OF THE INVENTION

An embodiment of the present invention includes a plug assembly that includes a plug head made of a sacrificial material that is attached to a plug stem with two retainer half rings. The plug assemblies of this invention are adapted for use in industries such as, for example, mining, chemical processing, and oil and gas refining, where the flow is abrasive and/or corrosive and which may contain substantial quantities of sediment, debris or scale. Valves in certain erosive and/or corrosive flow streams encounter a significant amount of sediment, debris or scale which comes through the pipe line. This invention provides plug heads and stems being made of dissimilar materials having different properties that optimize the performance of the plug head, the plug stem and the fastening band. Also, this invention is adapted to ease the process of repair and replacement of valve plug components, permitting maintenance to be accomplished in the field without requiring specialized manufacturing equipment or highly skilled personnel. The invention is also adapted to provide a tight shutoff by permitting improved alignment of the plug head and seat ring.

In a particular embodiment of the invention, the plug assembly allows the plug head to shift from side to side. When control valves are produced, there is always a certain amount of variation in the parts and assembly. However, in order to provide tight shutoff, the plug head and seat ring must line up perfectly. Since manufacturers cannot make the parts perfectly, plug assemblies need a certain amount of adjustability.

In most valves, the seat ring can shift a little from side to side to allow the seat ring to center up on the plug. This is typically done by keeping the bonnet a little loose while stroking the plug into the seat repeatedly. Once the seat ring has moved to center itself, the bonnet is then tightened, locking the seat into place. This process is described in detail in the Mark One User Manual (VLENIM0001) steps 7.9 to 7.9.2, the contents of which are incorporated by reference herein. Some valve designs allow the bonnet to shift a little from side to side instead of shifting the seat ring, as when a screwed in seat is used. In the case of survivor, the seat ring is pinched between the valve outlet and the valve body. Performing a seat centering procedure is more difficult and is described in the Survivor User Manual (VLENIM0036), the contents of which are incorporated by reference herein.

Because this process is so difficult to perform, one particular embodiment of the present assembly is configured to allow the plug head to float (instead of the bonnet or seat ring). This particular embodiment allows the plug head to move slightly from side to side. This action allows the plug head to find a natural center on the seat ring, providing the best shutoff possible.

Figure 1:
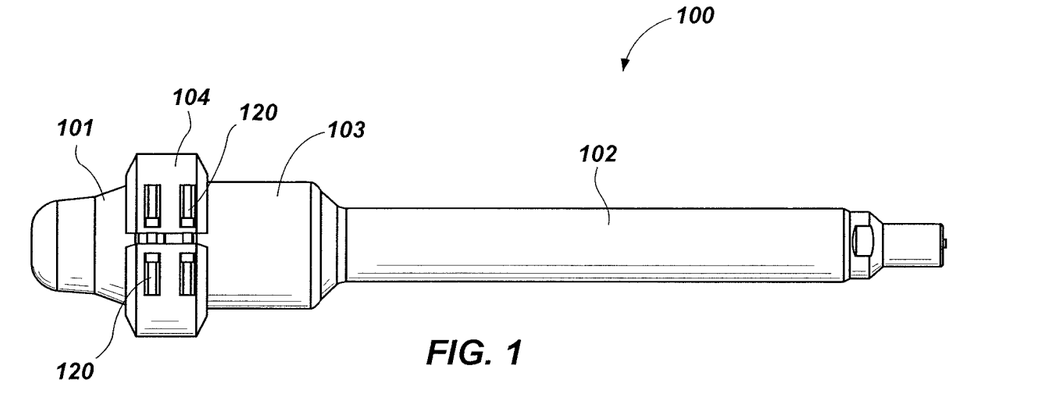
FIG. 1 illustrates a side view of a plug head and a plug stem according to an embodiment of the present invention.
Figure 2:
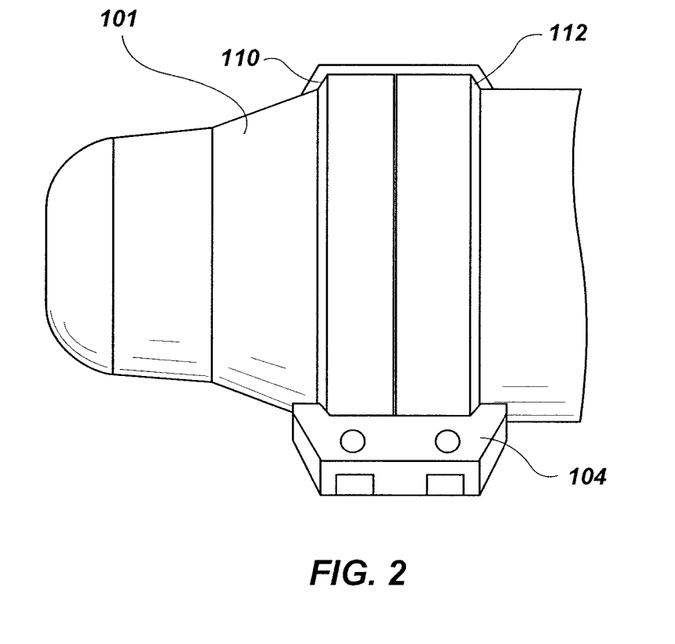
FIG. 2 illustrates an enlarged view of clamps, plug stem, and plug head according to an embodiment of the invention.
Figure 3:
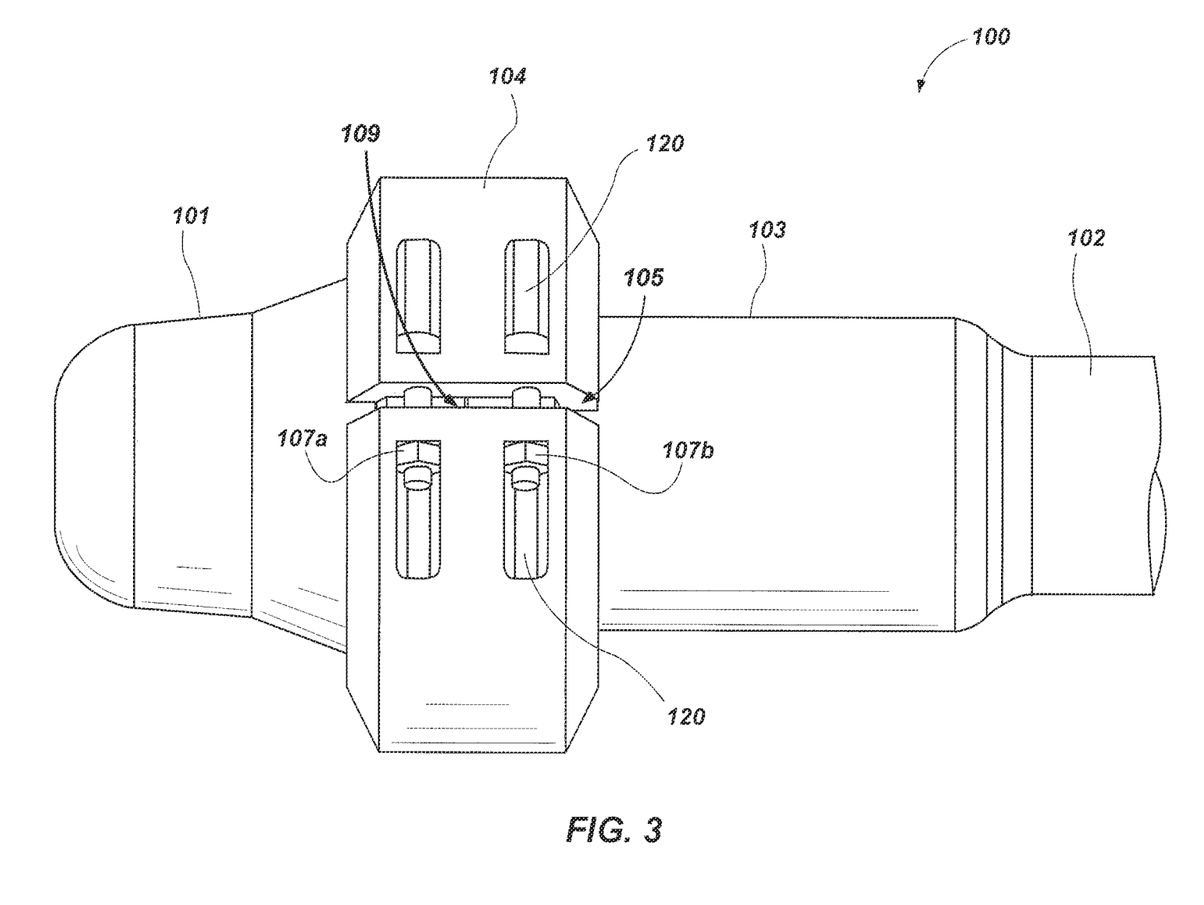
FIG. 3 illustrates an enlarged side view of a plug head and a plug stem according to an embodiment of the present invention.

Referring to FIGS. 1 and 3, a particular embodiment of the plug head and plug stem of the present invention is illustrated. A valve plug 100 is shown having a plug head 101 held in a plug stem base 103 which in turn is mounted on the plug stem 102. As shown in FIG. 2, the plug head 101 includes a base portion with a beveled edge 110. A distal portion of the plug stem 102 includes a beveled edge 112. The plug head 101 is held in the plug stem base 103 by two clamps (half rings) 104 which provide an interference fit 109 between the plug head 101 and the plug stem 102. The two clamps 104 may be configured such that a gap 105 is left therebetween. The two clamps 104 are fitted over the plug head 101 and the plug stem base 103 and are tightly held in place by four bolts 120. In a particular embodiment of the invention, the bolts 120 are fixed in place by nuts 107*a*, 107*b*. Alternatively, two clamps can be held in place by pins, screws, welds, brazing, clamps or the equivalent. Additionally, the clamps 104 can include a hinge mechanism or tongue-and-groove mechanism to hold the two clamps 104 together on one end, while relying on two bolts 120 to secure the two clamps 104 together at an opposing end. The two clamps 104 can provide shock absorbing capabilities and stress relief to the plug head 101 during use.

The preferred plug head 101 can be composed of structural ceramics because of its resistance to wear and degradation in flow streams that are erosive (having fine-grit particles) and corrosive (due to the chemical composition of the flow). Structural ceramics are a class of materials that includes, but is not limited to silicon carbide, silicon nitride, aluminum oxide, zirconium oxide, tungsten carbide, whisker-reinforced blends of ceramics, two-phase ceramics, and the like. Alternative materials which may be substituted for structural ceramics for the plug head 101, include, but are not necessarily limited to, cermets, which are compounds that are combinations of ceramics and metals, cast iron, silicon iron, white iron, heat treated martensitic steels (such as 440 or 416 grade steel), CrCoFe alloys (such as STELLITE® alloy 3, STELLITE® alloy 6, and STELLITE® 12), or other metals. Alternative materials with similar properties can be substituted without departing from the concept of this invention.

The plug stem 102, plug stem base 103 and clamps 104 can be composed of materials selected for ease of machining to a smooth surface, having good tensile strength, reasonable ductility and cost effectiveness. Included within this class of materials are titanium and its alloys, zirconium and its alloys, niobium and its alloys, titanium-niobium alloys, alloy steels, carbon steels, iron-based superalloys, stainless steels, nickel and its alloys, nickel-based superalloys, copper-based alloys, cobalt alloys, cobalt-based superalloys, aluminum and its alloys, magnesium alloys, tantalum, and the like. Alternative materials with similar properties can be substituted without departing from the concept of this invention.

The clamps 104 can be composed of metal alloys, including but not limited to titanium and its alloys, zirconium and its alloys, niobium and its alloys, titanium-niobium allows, alloy steels, carbon steels, iron-based superalloys, stainless steels, nickel and its alloys, nickel-based superalloys, copper-based alloys, cobalt alloys, cobalt-based superalloys, aluminum and its alloys, magnesium alloys, tantalum and metals of similar properties. Alternative materials with similar properties can be substituted without departing from the concept of this invention.

Figure 4:
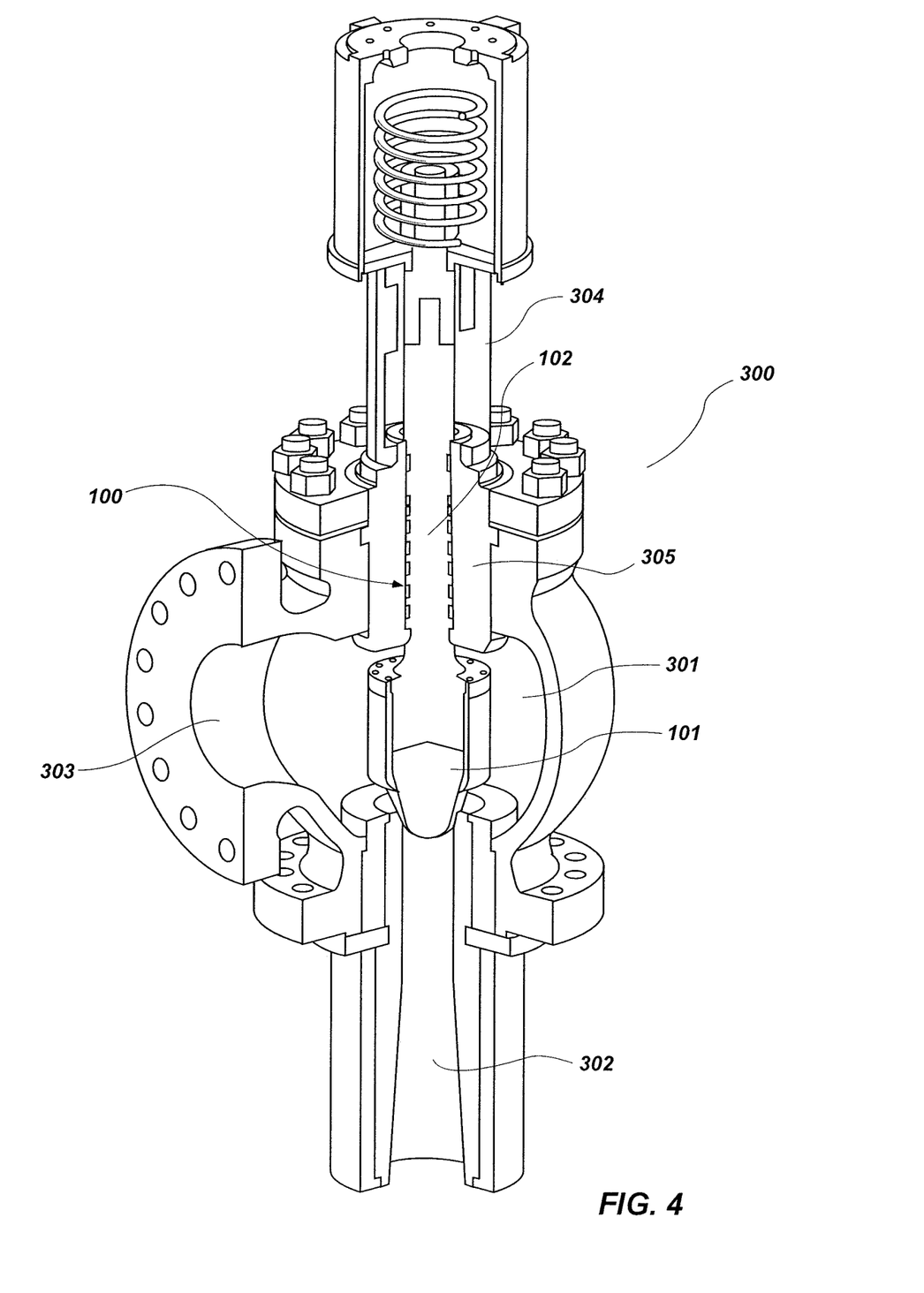
FIG. 4 illustrates a representative system of a valve plug according to an embodiment of the present invention in a valve assembly.

FIG. 4 shows a representative system of a valve plug 100 of this invention in a valve assembly 300. The valve plug 100 is shown in a substantially closed position with the plug head 101 closing a first flow path 303 from the valve chamber 301 and a second flow path 302. The plug stem 102 is shown connected to the actuator 304 and sealed with the shaft 305 in close, preferably fluid tight proximity, with valve stem support (or shaft support) packing (not shown). FIG. 4 shows an embodiment of the valve plug 100 in its working environment in a typical valve assembly 300. The actuator 304 functions to position the valve plug 100 either in the shown closed position or retracted to permit fluid flow from the first flow path 303 to the second flow path 302. Alternatively, the flow can, as is common in some valves, flow in the opposite direction.

Figure 5:
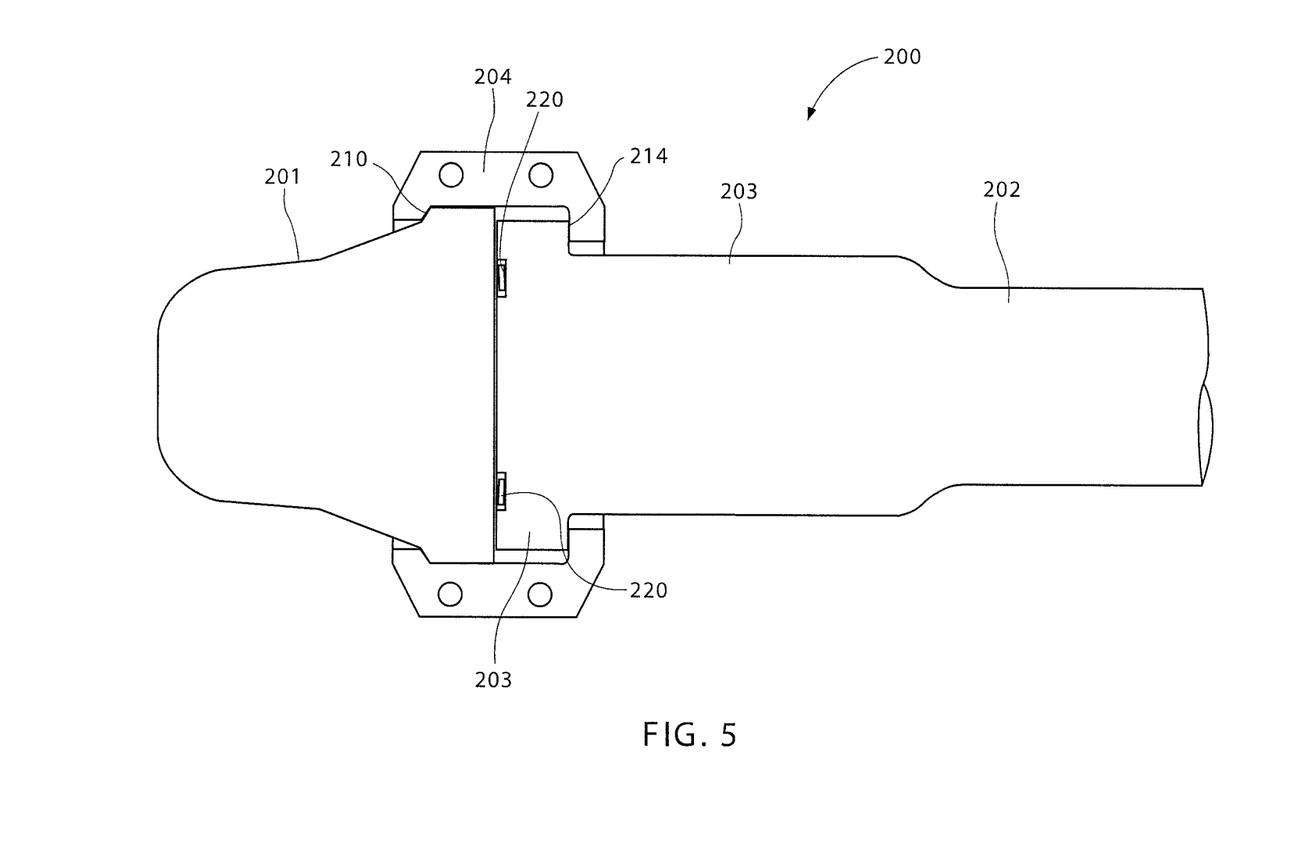
FIG. 5 illustrates a section view of a valve plug having a plug head mounted to plug stem base of a plug stem according to an embodiment of the invention.

FIG. 5 shows a section view of an alternative embodiment of a valve plug 200 having a plug head 201 mounted to plug stem base 203 of a plug stem 202, this embodiment having additional compliance structure provided. In contrast to the embodiment described in FIG. 1, the present embodiment includes a plug stem base 203 having a base portion with a non-beveled end or edge 214. Additionally, the plug stem base 203 can have a smaller diameter than the diameter of the plug head 201. Plug head 201 can include a base portion with a beveled edge 210. This design permits the plug head 201 and clamps 204 to move and adjust relative to the plug stem 202, which allows the plug head 201 to self center when in use in a valve assembly, such as the valve assembly 300 of FIG. 4. An embodiment of the valve plug 200 can include washers or springs 220 within or adjacent to plug stem base 203 to provide cushioning and separation between the plug stem base 203 and the plug head 201. Representative spacers include, but are not limited to Bellville washers and spring mechanisms.

Alternative embodiments of the invention include spacers (not shown) on the bolt sections between sections of the clamps 204 that are adjacent to plug head 201 in order to prevent deflection of the clamps 204.

The described embodiments, including the various materials, specific components, and dimensions, are to be considered in all respects only as illustrative and not as restrictive. The invention should not be considered limited to the particular preferred and alternative embodiments, rather the scope of the invention is indicated by the appended claims. All changes, modifications and alternatives which come within the meaning and range of equivalency of the claims are to be embraced as within their scope.

What is claimed is:

1. A method of replacing or attaching a plug head to a plug stem comprising:
    providing a valve plug having a plug stem, a plug stem base, and a plug head, the plug head and the plug stem base each having a diameter greater than a diameter of a major portion of the plug stem, the plug stem base having a first beveled edge, the plug head having a second beveled edge;
    providing a fastening mechanism for fastening the plug stem base to the plug head, the fastening mechanism comprising:
        at least two retainer clamps that surround and provide an interference fit between the first beveled edge of the plug stem base and the second beveled edge of the plug head; and
        an interconnecting mechanism joining the at least two retainer clamps on at least one end of the at least two retainer clamps, wherein the at least two retainer clamps and the interconnecting mechanism are configured to form at least one gap between a first retainer clamp of the at least two retainer clamps and an adjacent retainer clamp of the at least two retainer clamps to which the first retainer clamp is joined, the at least one gap sized and configured to provide access to the interconnecting mechanism extending between the first retainer clamp and the adjacent retainer clamp;
    placing the plug stem base in direct contact with the plug head;
    coupling the fastening mechanism around the plug stem base and the plug head while the plug stem base remains in direct contact with the plug head; and
    tightening the fastening mechanism against the first beveled edge of the plug stem base and the second beveled edge of the plug head to provide the interference fit between the plug stem base and the plug head with the plug stem base in direct contact with the plug head.

2. The method of claim 1, further comprising selecting the fastening mechanism to comprise a sacrificial interconnecting mechanism adapted for destructive removal to release the plug head from the plug stem base.

3. The method of claim 2, further comprising selecting the sacrificial interconnecting mechanism to comprise bolts, pins, screws, welds, brazing, or clamps.

4. The method of claim 2, further comprising destructively cutting the sacrificial interconnecting mechanism.

5. The method of claim 1, further comprising enabling the plug head to move side to side to allow the plug head to find a natural center after securing the plug head with the fastening mechanism.

6. The method of claim 1, further comprising removing the plug head by cutting the fastening mechanism that is made of a sacrificial material from the plug stem base and replacing the fastening mechanism with another fastening mechanism.

7. The method of claim 1, further comprising securing the at least two retainer clamps with sacrificial bolts configured for removal from the fastening mechanism and from the plug stem base and replacement with another set of sacrificial bolts.

8. The method of claim 7, further comprising securing the sacrificial bolts with nuts.

9. The method of claim 1, further comprising holding the at least two retainer clamps in place with sacrificial pins, screws, welds, brazing, or clamps.

10. The method of claim 1, further comprising providing the fastening mechanism with shock absorbing capabilities relative to the plug head.

11. The method of claim 1, further comprising selecting the plug stem to comprise at least one of titanium, zirconium, niobium, alloy steels, carbon steels, iron-based superalloys, stainless steels, nickel, nickel-based superalloys, copper-based alloys, cobalt alloys, cobalt-based superalloys, aluminum, magnesium alloys, tantalum, or an alloy.

12. The method of claim 1, further comprising selecting the plug head to comprise at least one of silicon carbide, silicon nitride, aluminum oxide, zirconium oxide, tungsten carbide, whisker-reinforced blends of ceramics, two-phase ceramics, or cermets.

13. The method of claim 1, further comprising selecting the fastening mechanism to comprise at least one of titanium, zirconium, niobium, alloy steels, carbon steels, iron-based superalloys, stainless steels, nickel, nickel-based superalloys, copper-based alloys, cobalt alloys, cobalt-based superalloys, aluminum, magnesium alloys, tantalum, or an alloy.

14. The method of claim 1, further comprising selecting the plug stem base to have a smaller diameter than the diameter of the plug head.

15. The method of claim 1, further comprising spacing each of the at least two retainer clamps apart from one another with the interconnecting mechanism.

16. A method of replacing or attaching a plug head to a plug stem comprising:
    providing a valve plug having a plug stem, a plug stem base, a plug head, and at least two clamp sections, the plug head and the plug stem base each having a diameter greater than a diameter of a major portion of the plug stem, the plug stem base having a first beveled edge, the plug head having a second beveled edge, the at least two clamp sections surrounding and providing an interference fit between the first beveled edge of the plug stem base and the second beveled edge of the plug head, the at least two clamp sections joined together with and spaced apart by a sacrificial interconnecting element with a gap defined between the at least two clamp sections, the sacrificial interconnecting element extending through the gap;
    destructively removing the sacrificial interconnecting element from the plug stem base and the plug head by cutting the sacrificial interconnecting element extending through the gap; and replacing the sacrificial interconnecting element with another sacrificial interconnecting element.

17. The method of claim 16, further comprising cutting the sacrificial interconnecting element.

18. A method of replacing or attaching a plug head to a plug stem, the method comprising:
positioning two or more clamp sections of a coupling element around an enlarged portion of a plug head and an enlarged portion of a plug stem base of a valve plug;
securing the two or more clamp sections around to provide an interference fit between the enlarged portion of the plug head and the enlarged portion of the plug stem base by tightening a sacrificial interconnecting element comprising at least one bolt at two or more interfaces between the two or more clamp sections, the at least one bolt extending between the two or more clamp sections at each of the two or more interfaces;
spacing the two or more clamp sections relative to each other with a gap defined at one of more of the two or more interfaces; and
extending the at least one bolt through the gap.

19. The method of claim 18, further comprising:
destructively removing the sacrificial interconnecting element from the plug stem base and the plug head; and
replacing the sacrificial interconnecting element with another sacrificial interconnecting element.

20. The method of claim 18, further comprising enabling the plug head to move side to side to allow the plug head to find a natural center after securing the two or more clamp sections.

* * * * *